United States Patent [19]

De Masters

[11] 4,033,420

[45] July 5, 1977

[54] WEIGHING SCALE

[75] Inventor: James J. De Masters, Elmhurst, N.Y.

[73] Assignee: Brookline Instrument Company, Inc., Wallingford, Conn.

[22] Filed: May 20, 1976

[21] Appl. No.: 688,321

[52] U.S. Cl. .............................. 177/126; 177/130; 177/140; 177/145; 280/43.13

[51] Int. Cl.$^2$ ................ G01G 21/00; G01G 19/03; B62D 21/14

[58] Field of Search .......... 177/126, 130, 140, 145; 280/43.13

[56] References Cited

UNITED STATES PATENTS

| 2,358,770 | 9/1944 | Carliss | 177/130 |
| 3,431,992 | 3/1969 | Whitecar | 177/140 |
| 3,530,949 | 9/1970 | Swarsay et al. | 177/213 X |
| 3,630,299 | 12/1971 | Albagli | 177/145 |
| 3,961,675 | 6/1976 | Siegel | 177/126 |

FOREIGN PATENTS OR APPLICATIONS 2,212,292  11/1972  Germany .................... 280/43.13

Primary Examiner—George H. Miller, Jr.
Attorney, Agent, or Firm—Cooper, Dunham, Clark, Griffin & Moran

[57] ABSTRACT

This scale is primarily intended for the weighing of a hospital bed containing a patient. It may weigh an empty bed or any wheeled load. The scale is mounted on a frame which rests on the floor during a weighing operation, and is lifted off the floor onto a set of casters for moving the scale from one location to another. A detachable handle is provided for pulling the scale on its casters. The scale frame is oblong. The bed being weighed is supported on two channel-shaped rails, which are upwardly open. A pair of upwardly open, channel-shaped ramps are provided for rolling a bed onto the weighing rails from either side of the scale. The rails are provided with retractable blocking bars at both ends to prevent a bed from accidentally rolling off the rail. The ramps are removable. Provision is made for mounting the ramps on the scale during movement of the scale from one location to another.

12 Claims, 8 Drawing Figures

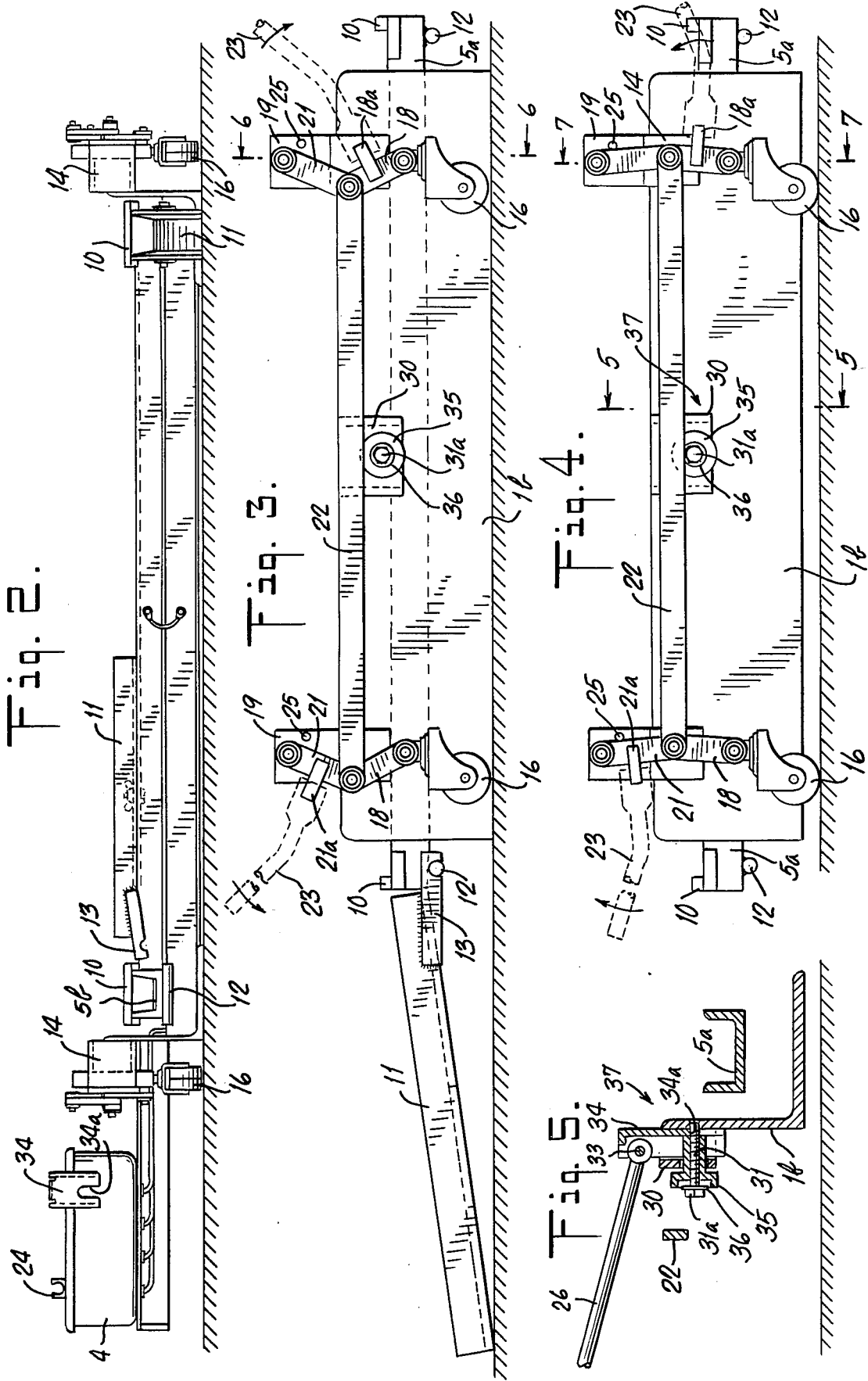

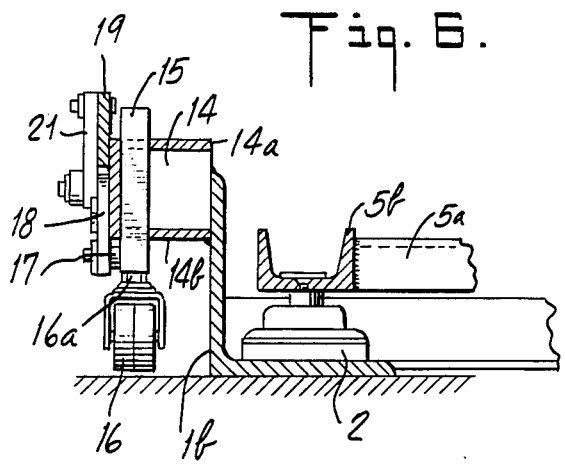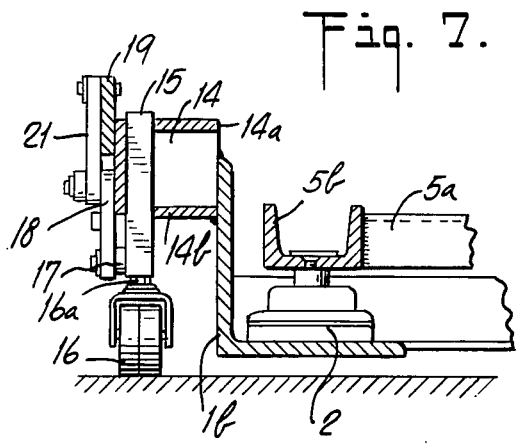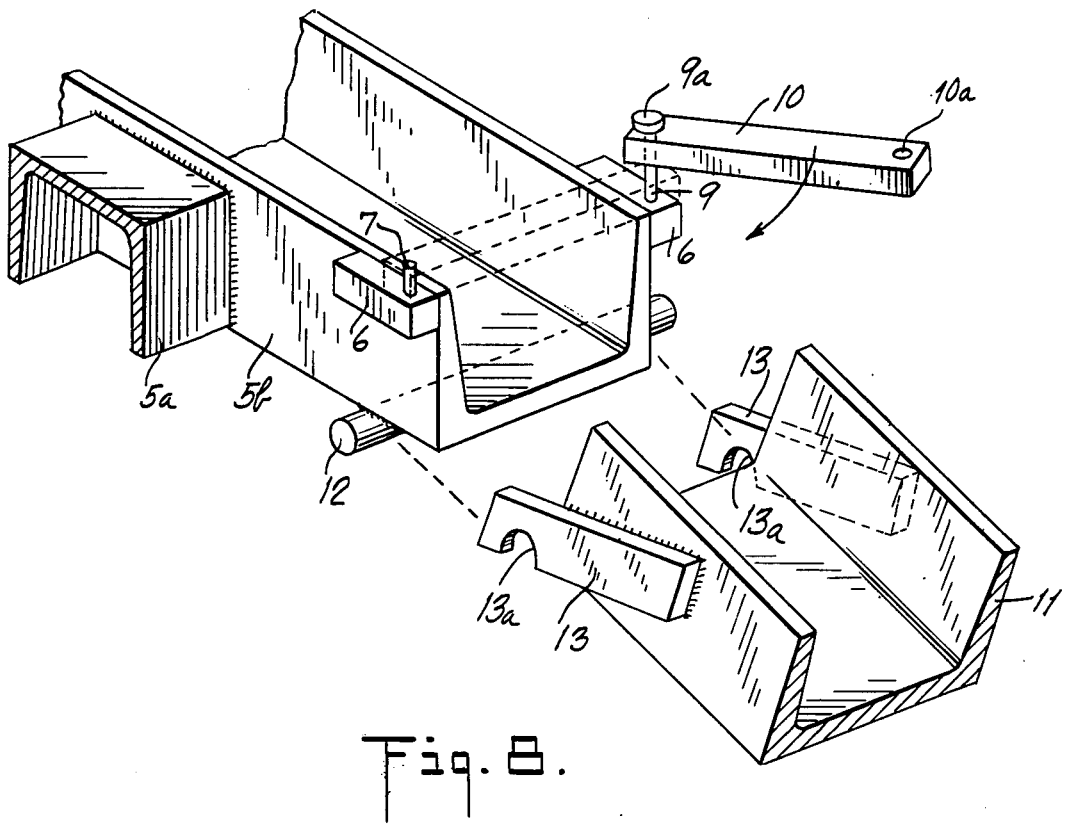

WEIGHING SCALE

CROSS-REFERENCE

This scale is an improvement on the scale illustrated in Swersey et al, U.S. Pat. No. 3,530,949, dated Sept. 29, 1970.

BRIEF SUMMARY

The scale of this invention is constructed to facilitate movement of a wheeled load, such as a bed, on and off the scale. It is also constructed to change quickly between a rolling condition in which it may be moved from one location to another and a weighing condition in which it is stationary on the floor. The scale is provided with four casters, two at each end. The frame rests on the floor when the scale is in the weighing condition, and may be lifted from the floor onto the casters by a pair of linkages, one at each end, which are manually operable by a detachable handle.

The scale has an oblong frame with two short sides and two long sides. A bed being weighed is supported on a pair of upwardly open, channel-shaped rails, which extend across the short sides of the frame. Retractable blocking bars are provided at each end of each rail. In their blocking positions, these bars prevent the bed from accidentally rolling off the scale. When retracted, the bars allow the bed to roll off the open ends of the rails. Removable ramps are provided for loading a bed onto the rails. The ramps are also upwardly open, channel-shaped members, and are removable so that they may be used on either side of the scale, or loaded on the scale for transportation.

DRAWINGS

FIG. 1 is a plan view of a scale embodying the invention.

FIG. 3 is a right end view of the scale shown in FIG. 2, again showing the scale in its weighing position.

FIG. 4 is a view similar to FIG. 3, showing the scale in its traveling position.

FIG. 5 is a fragmentary sectional view taken on the line 5—5 of FIG. 4.

FIG. 6 is a sectional view taken on the line 6—6 in FIG. 3.

FIG. 7 is a sectional view taken on the line 7—7 in FIG. 4.

FIG. 8 is an exploded perspective view showing a ramp supporting mechanism and a rail blocking bar.

DETAILED DESCRIPTION

Figure 2:
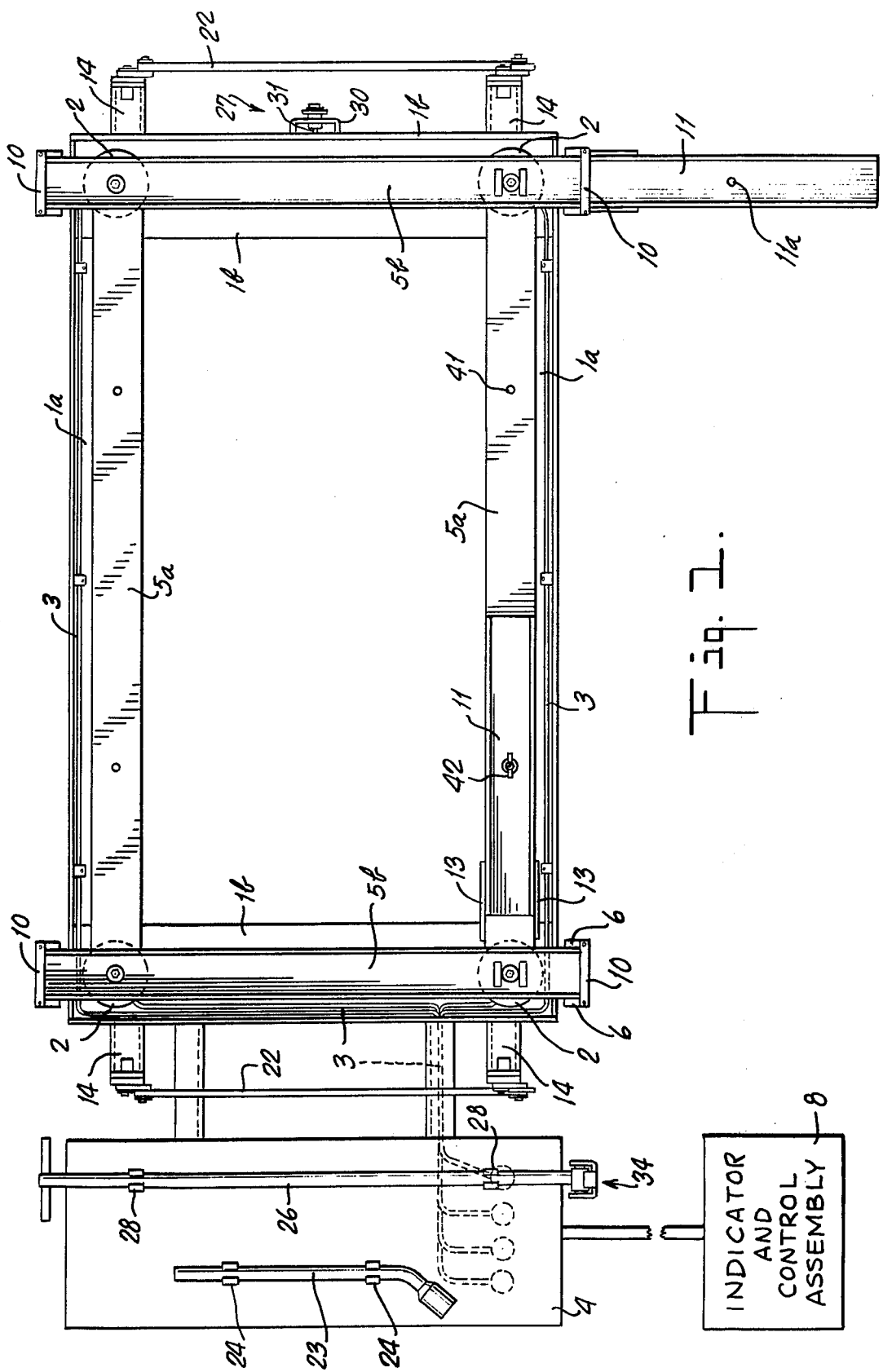
FIG. 2 is a front elevational view of the scale of FIG. 1, showing the scale frame resting on the floor in its weighing position.

This scale comprises a base frame in the form of a hollow rectangle with two long side members $1a$ and two short side members $1b$. The side members $1a$ and $1b$ are peferably angle irons, as best seen in FIGS. 6 and 7. In each corner of the base 1 is mounted a hydraulic load cell 2, all connected by conduits 3 to a balance mechanism 4, which is in turn connected to an indicator and control assembly 8, shown only diagrammatically, and which may be the same as that illustrated in U.S. Pat. No. 3,530,949, mentioned above.

Mounted on the load cells 2 is a secondary frame comprising two elongated side rails $5a$ and two shorter end rails $5b$. The end rails are of channel-shaped cross-section, with the open side of the channel facing upwardly so as to receive and guide the wheels on a wheeled load, such as a bed.

At each end of each rail $5b$, a pair of wings 6 (best seen in FIG. 8) are welded to its outer sides. A straight cylindrical pin 7 projects upwardly from the left-hand wing 6, as viewed in FIG. 8, and is receivable in an aperture $10a$ in a retractable blocking bar 10. Another pin 9 having a head $9a$ projects upwardly from the right-hand wing 6, and extends through another aperture $10b$ in the bar 10, with the head $9a$ above the bar to limit the upward movement thereof. The bar may be moved from the retracted position, shown in full lines in FIG. 8, to a blocking position, shown in dotted lines. This movement is accomplished by pivoting the bar 10 on the pin 9, and lifting it as required to engage or disengage it from the pin 7. When the bar 10 is in its blocking position at the end of the rail $5b$, a bed resting in the rail cannot accidentally roll off the end of the rail. When the bar is retracted, the bed can freely roll off the rail.

A bed or other wheeled load may be moved on or off the rails $5b$ by placing a pair of ramps 11 in the position illustrated in FIG. 3, and at the lower right in FIG. 1. Each ramp 11 has a channel-shaped cross-section, and has its open side facing upwardly.

Welded to the underside of each rail $5b$ adjacent each end thereof is a crossbar 12. A pair of arms 13 are welded on the outside of the one end of each ramp 11. The arms 13 are provided with recesses $13a$ in their bottom surfaces, which are adapted to rest on the projecting ends of the crossbar 12, as shown in FIG. 3. When the ramps are in place, as shown in FIG. 3, a bed can be readily rolled up to ramps 11 onto the rails $5a$ to be supported by the scale. The blocking bars 10 may then be put in place, thereby securing the bed in position on the scale.

During the weighing, the ramps 11 must be removed from the positions just described. During transportation of the scale, and during weighing, the ramps may be mounted in storage positions on the rail $5a$, as shown in the case of the left ramp 11 in FIGS. 1 and 2. Studs 41 (FIG. 1) extend upwardly from the rail $5a$ and may be received in holes $11a$ in the ramps 11. Wing nuts 42 (FIG. 1) on the studs hold the ramps 11 in position on the rail $5a$. The arms 13 then embrace the sides of the rail $5a$, and assist in holding the ramps in place.

When it is desired to move the scale from one location to another, the base 1 is lifted off the floor and its weight transferred to four casters 16 by the mechanism as illustrated in FIGS. 3, 4, 6 and 7. Adjacent each end of each of the short base frame members $1b$, near its upper edge, there is provided a box-like extension 14 having upper and lower walls $14a$ and $14b$ (FIGS. 6 and 7) which are apertured to receive slidably a sleeve 15. A caster 16 of conventional form has its spindle $16a$ rotatably received in each sleeve 15 and held against outward movement from that sleeve. Welded to the lower end of each sleeve 15 is a projection 17 on which is pivoted a link 18. The upper end of each link 21 is, in turn, pivoted to a plate 19 welded on the upper end of the extension 14. Each set of links 18, 21 constitutes an over-center linkage. A transverse link 22 extends between the common pivots of the links 18 and 21 at the ends of the short base frame member $1b$. The link 21 appearing at the left in FIG. 3 is provided with a fixed extension $21a$. A similar fixed extension $18a$ is provided on the link 18 at the right end side of FIG. 3. A handle 23 (FIG. 1) is carried in a pair of spring clips 24 fixed to the top of the balance mechanism 4, and may be removed from those clips. A socket on the end of the handle 23 fits either the projection 21a or the projection 18a. When the handle 23 is connected to either of those projections, it may be employed to swing the linkages 18, 21 and 22 over center from the position shown in FIG. 3 to the position shown in FIG. 4, or vice versa. A stop pin 25 limits the motion of the over-center linkage in the direction shown in FIG. 4. When the parts are in that position, the casters 16 engage the floor and the base frame member 1b is lifted from the floor. When the parts are in the position shown in FIG. 3, the casters 16 may have their wheels resting against the floor, but the base frame member 1b is supported directly by the floor and not by the linkages 18, 21 and the casters.

The projection 18a is on the lower link 18 at the right side as viewed in FIGS. 3 and 4, and the projection 21a is on the upper link 21 at the left side. Hence, when the handle 23 is operated from either side of the scale, an upward movement of the handle lowers the base onto the floor, and a downward movement of the handle raises the base from the floor onto the casters 16. That is to say, operation of handle 23 in a given sense on either side of the base provides the same motion of the sleeve. See the arrows in FIGS. 3 and 4.

During the movement of the mechanism from the position shown in FIG. 3 to the position shown in FIG. 4, or vice versa, the rail 5b at that end of the scale is mounted parallel with the ground at all times. Hence, if it is desired to move the scale while a bed and a patient are supported on it, there is no tendency to tilt the bed in a direction to unload it from the scale, by virtue of the operation of this jacking mechanism.

A drawbar 26 is supported on the top of the balance mechanism 4 when not in active use. The drawbar is held in that position by clips 28. One end of the drawbar 26 is connected by a pivot pin 33 to a channel-shaped coupler 34 (FIGS. 1, 2 and 5) slotted at 34a.

A mating coupler 27 is mounted on the base frame 1b. The coupler 27 includes a yoke 30 having its ends welded to the base frame 1b and a bolt 31 extending through an opening in the yoke 30 and having its inner end welded to the frame 1b. A manually rotatable knob 35 is threaded on the bolt 31. A bolt head 31a and a washer 36 limit the movement of the knob away from the yoke 30.

When it is desired to pull the scale along the floor on its casters, the drawbar 26 is removed from the clips 28 and the flange 34 is inserted between the yoke 30 and the frame 1b, with the bolt 31 entering the slot 34a. The knob 35 is then tightened to maintain the drawbar in place, after which the scale may be readily pulled along the floor by means of the drawbar.

1. A scale for weighing a wheeled load, comprising:
   a. a frame for supporting the load during weighing, including rails for receiving and guiding the wheels;
   b. ramps for supporting and guiding the wheels during movement of the load onto the rails;
   c. load cell means supporting said frame and any load thereon;
   d. indicator means operated by the load cell means; and
   e. means for removably connecting one end of each ramp to one end of each rail, said removable connecting means comprising a crossbar under each rail adjacent an end thereof and projecting from opposite sides thereof, and a pair of projections on the outer sides of one end of each ramp, said projections having recesses to engage the projecting ends of the crossbars.

2. A scale for weighing a wheeled load, comprising:
   a. a frame for supporting the load during weighing, including upwardly open, channel-shaped rails for receiving and guiding the wheels;
   b. ramps for supporting and guiding the wheels during movement of the load onto the rails;
   c. load cell means supporting said frame and any load thereon;
   d. indicator means operated by the load cell means;
   e. retractable blocking bars adjacent the ends of the rails for preventing accidental movement of the wheels off said ends;
   f. pivot means connecting one end of each blocking bar to one side of its associated rail to permit movement of the bar between a blocking position in which it extends across its associated channel-shaped rail and a retracted position in which the rail is open; and
   g. fastening means on the opposite side of each rail from the respective pivot means for engaging the other end of the blocking bar to hold it in its blocking position.

3. A scale for weighing a wheeled bed, comprising:
   a. a rectangular frame for supporting the bed during weighing, including two upwardly open, channel-shaped rails for supporting and guiding the wheels of the bed;
   b. a pair of upwardly open, channel-shaped ramps for supporting and guiding the wheels of the bed during movement thereof on and off the rails;
   c. a rectangular base;
   d. load cell means on the base and supporting the frame;
   e. indicator means operated by the load cell means;
   f. at least three wheels for supporting the base; and
   g. means for moving each base-supporting wheel between an active position in which the base is lifted from an underlying surface and is supported in part by the wheel for travel along said surface, and a retracted position in which the base rests on said underlying suface; said moving means including, for each wheel:
      1. means connecting the base and the wheel including an over-center linkage, and means limiting the linkage movement in one direction to establish said active position; and
      2. means for applying an operating force to said linkage.

4. A scale as in claim 3, in which said force applying means comprises a handle detachable from and attachable to said linkage.

5. A scale as in claim 3, including two wheels at one end of the base, a transverse link connecting the two over-center linkages thereof so that those two wheels are operated concurrently between their active positions and their retracted positions.

6. A scale as in claim 3, including:
   a. means for removably mounting said ramps at the ends of said rails; and
   b. means for removably mounting said ramps on the frame for travel of the scale on its wheels.

7. A scale as in claim 3, including a detachable drawbar for pulling the scale when mounted on its wheels, and means supported on the base for carrying said drawbar when not in use.

8. A movable weighing scale, comprising:
a. a frame for supporting a load to be weighed;
b. a movable base;
c. load cell means on the base and supporting the frame;
d. indicator means operated by the load cell means;
e. at least three wheels for supporting the base; and
f. means for moving each base-supporting wheel between an active position in which the base is lifted from an underlying surface and is supported in part by the wheel for travel along said surface, and a retracted position in which the base rests on said underlying surface; said moving means including, for each wheel:
  1. means connecting the base and the wheel including an over-center linkage, and means limiting the linkage movement in one direction to establish said active position; and
  2. means for applying an operating force to said linkage.
9. A movable weighing scale as in claim 8, in which:
a. said connecting means includes:
  1. a spindle connected to the wheel and rotatable about a vertical axis;
  2. a sleeve receiving said spindle; and
  3. means on the base guiding the sleeve for movement between an active position in which the wheel engages an underlying surface and supports the base, and a retracted position in which the base rests on said underlying surface; and
b. said over-center linkage includes:
  1. a first link pivotally connected at one end to the base;
  2. a second link pivotally connected at one end to the sleeve; and
  3. means pivotally connecting the other ends of said links.
10. A movable weighing scale as in claim 8, in which said force applying means comprises a handle detachable from and attachable to one of said links.
11. A movable weighing scale as in claim 8, including:
a. a pair of wheels at opposite sides of the base;
b. a pair of said connecting means for said pair of wheels; and
c. a transverse link pivoted at its ends to the two connecting means for concurrent operation thereof.
12. A movable weighing scale as in claim 11, in which:
a. each said over-center linkage includes:
  1. a first link pivotally connected at one end to the base;
  2. a second link pivotally connected at one end to a wheel; and
  3. means pivotally connecting the other ends of said links; and
b. said means for applying an operating force includes:
  1. a handle attachable to and detachable from one link;
  2. first handle attaching means on the first link at one side of the base; and
  3. second handle attaching means on the second link at the other side of the base;
  4. so that when said handle is operated in a given sense on either side of the base, it produces vertical motion of the wheel in the same sense.

* * * * *